(12) United States Patent
Aggarwal et al.

(10) Patent No.: US 7,787,380 B1
(45) Date of Patent: *Aug. 31, 2010

(54) RESOURCE RESERVATION PROTOCOL WITH TRAFFIC ENGINEERING POINT TO MULTI-POINT LABEL SWITCHED PATH HIERARCHY

(75) Inventors: Rahul Aggarwal, San Francisco, CA (US); Yakov Rekhter, New Rochelle, NY (US)

(73) Assignee: Juniper Networks, Inc., Sunnyvale, CA (US)

( * ) Notice: Subject to any disclaimer, the term of this patent is extended or adjusted under 35 U.S.C. 154(b) by 442 days.

This patent is subject to a terminal disclaimer.

(21) Appl. No.: 11/508,096

(22) Filed: Aug. 22, 2006

Related U.S. Application Data (60) Provisional application No. 60/817,851, filed on Jun. 30, 2006.

(51) Int. Cl.
  *G01R 31/08* (2006.01)
  *G06F 11/00* (2006.01)
  *G08C 15/00* (2006.01)
  *H04J 1/16* (2006.01)
  *H04J 3/14* (2006.01)
  *H04L 1/00* (2006.01)
  *H04L 12/26* (2006.01)

(52) U.S. Cl. .................. 370/236; 370/312; 370/390; 370/392; 370/395.5; 370/432; 370/469; 370/536; 370/542

(58) Field of Classification Search .................. 370/236, 370/312, 389, 390, 392, 395.5, 432, 469, 370/536–537, 542

See application file for complete search history.

(56) References Cited

U.S. PATENT DOCUMENTS 6,553,028 B1    4/2003   Tang et al.
6,778,531 B1    8/2004   Kodialam et al.

(Continued)

FOREIGN PATENT DOCUMENTS

| JP | 2005-130258 | 5/2005 |
| JP | 2005-167482 | 6/2005 |
| JP | 2005-252385 | 9/2005 |

OTHER PUBLICATIONS

Requirements for point to multipoint extension to RSVP-TE, Yasukawa et al. Oct. 2003.*
Establishing point to multipoint MPLS TE LSPs, Wei et al. Aug 2004.*

(Continued)

*Primary Examiner*—Daniel J Ryman
*Assistant Examiner*—Nishant B Divecha
(74) *Attorney, Agent, or Firm*—Shumaker & Sieffert, P.A.

(57) ABSTRACT

The invention is directed toward techniques for Multi-Protocol Label Switching (MPLS) upstream label assignment for the Resource Reservation Protocol with Traffic Engineering (RSVP-TE). The techniques include extensions to the RSVP-TE that enable distribution of upstream assigned labels in Path messages from an upstream router to two or more downstream routers of tunnel established over a network. The tunnel may comprise a RSVP-TE P2MP Label Switched Path (LSP) or an Internet Protocol (IP) multicast tunnel. The techniques also include extensions to the RSVP-TE that enable a router to advertise upstream label assignment capability to neighboring routers in the network. The MPLS upstream label assignment using RSVP-TE described herein enables a branch router to avoid traffic replication on a Local Area Network (LAN) for RSVP-TE P2MP LSPs.

17 Claims, 7 Drawing Sheets

U.S. PATENT DOCUMENTS

| | | | |
|---|---|---|---|
| 7,133,928 | B2 | 11/2006 | McCanne |
| 7,330,468 | B1 | 2/2008 | Tse-Au |
| 7,333,491 | B2 | 2/2008 | Chen et al. |
| 7,360,084 | B1 | 4/2008 | Hardjono |
| 7,366,894 | B1 | 4/2008 | Kalimuthu et al. |
| 7,418,003 | B1 | 8/2008 | Alvarez et al. |
| 7,463,591 | B1 | 12/2008 | Kompella et al. |
| 7,477,642 | B2 | 1/2009 | Aggarwal et al. |
| 7,483,439 | B2 | 1/2009 | Shepherd et al. |
| 7,545,735 | B1 | 6/2009 | Shabtay et al. |
| 2002/0118644 | A1 | 8/2002 | Moir |
| 2002/0186664 | A1 | 12/2002 | Gibson et al. |
| 2003/0012215 | A1 | 1/2003 | Novaes |
| 2003/0056007 | A1 | 3/2003 | Katsube et al. |
| 2003/0063591 | A1 | 4/2003 | Leung et al. |
| 2003/0087653 | A1 | 5/2003 | Leung et al. |
| 2003/0088696 | A1 | 5/2003 | McCanne |
| 2003/0172114 | A1 | 9/2003 | Leung |
| 2003/0177221 | A1 | 9/2003 | Ould-Brahim et al. |
| 2003/0191937 | A1 | 10/2003 | Balissat et al. |
| 2003/0210705 | A1 | 11/2003 | Seddigh et al. |
| 2004/0037279 | A1 | 2/2004 | Zelig et al. |
| 2004/0042406 | A1 | 3/2004 | Wu et al. |
| 2004/0151180 | A1 | 8/2004 | Hu et al. |
| 2004/0218536 | A1 | 11/2004 | Yasukawa et al. |
| 2004/0240445 | A1 | 12/2004 | Shin et al. |
| 2004/0240446 | A1 | 12/2004 | Compton |
| 2005/0001720 | A1 | 1/2005 | Mason et al. |
| 2005/0018693 | A1 | 1/2005 | Dull |
| 2005/0108419 | A1 | 5/2005 | Eubanks |
| 2005/0111351 | A1 | 5/2005 | Shen |
| 2005/0169270 | A1 | 8/2005 | Mutou et al. |
| 2005/0220132 | A1 | 10/2005 | Oman et al. |
| 2005/0265308 | A1 | 12/2005 | Barbir et al. |
| 2005/0271035 | A1 | 12/2005 | Cohen et al. |
| 2005/0271036 | A1 | 12/2005 | Cohen et al. |
| 2006/0039364 | A1 | 2/2006 | Wright |
| 2006/0126496 | A1 | 6/2006 | Filsfils et al. |
| 2006/0147204 | A1 | 7/2006 | Yasukawa et al. |
| 2006/0164975 | A1 | 7/2006 | Filsfils et al. |
| 2007/0025277 | A1 | 2/2007 | Sajassi et al. |
| 2007/0098003 | A1 | 5/2007 | Boers et al. |
| 2007/0124454 | A1 | 5/2007 | Watkinson |
| 2008/0056258 | A1 | 3/2008 | Sharma et al. |
| 2008/0123524 | A1 | 5/2008 | Vasseur et al. |
| 2008/0291921 | A1 | 11/2008 | Du et al. |
| 2009/0028149 | A1 | 1/2009 | Yasukawa et al. |

OTHER PUBLICATIONS

D. Awduche et al., "RFC 3209—RSVP-TE: Extensions to RSVP for LSP Tunnels," Network Working Group, Dec. 2001, 64 pgs. http://rfc.sunsite.dk/rfc/rfc3209html.

RSVP-TE: Resource Reservation Protocol—Traffic Extension, Javvin Company, 2 pgs, printed Apr. 18, 2005. http://www.javvin.com/protocolRSVPTE.html.

B. Zhang and H. Mouftah, "A Destination-initiated Multicast Routing Protocol for Shortest Path Tree Constructions," GLOBECOM 2003, IEEE Global Telecommunications Conference, XP010677629, pp. 2840-2844.

U.S. Appl. No. 11/212,509, entitled "Aggregate Multicast Trees For Multicast Virtual Private Networks," filed Aug. 26, 2005.

U.S. Appl. No. 11/212,500, entitled "Multicast Data Trees For Multicast Virtual Private Networks," filed Aug. 26, 2005.

U.S. Appl. No. 11/212,507, entitled "Reliable Exchange Of Control Information For Multicast Virtual Private Networks," filed Aug. 26, 2005.

U.S. Appl. No. 11/213,636, entitled "Transport Of Control And Data Traffic For Multicast Virtual Private Networks," filed Aug. 26, 2005.

U.S. Appl. No. 11/213,638, entitled "Shared Multicast Trees For Multicast Virtual Private Networks," filed Aug. 26, 2005.

U.S. Appl. No. 11/212,475, entitled "Label Switching Multicast Trees For Multicast Virtual Private Networks," filed Aug. 26, 2005.

U.S. Appl. No. 11/212,932, entitled "Multicast Trees For Virtual Private Local Area Network (LAN) Service Multicast," filed Aug. 26, 2005.

U.S. Appl. No. 11/213,637, entitled "Aggregate Multicast Trees For Virtual Private Local Area Network (LAN) Service Multicast," filed Aug. 26, 2005.

U.S. Appl. No. 11/212,490, entitled "Multicast Data Trees For Virtual Private Local Area (LAN) Service Multicast," filed Aug. 26, 2005.

U.S. Appl. No. 11/213,639, entitled "Exchange Of Control Information For Virtual Private Local Area Network (LAN) Service Multicast," filed Aug. 26, 2005.

U.S. Appl. No. 11/213,640, entitled "Auto-Discovery Of Multicast Virtual Private Networks," filed Aug. 26, 2005.

U.S. Appl. No. 11/213,641, entitled "Inter-Autonomous System (AS) Multicast Virtual Private Networks," filed Aug. 26, 2005.

U.S. Appl. No. 11/056,383, entitled "Fast Reroute Of Traffic Associated With A Point To Multi-Point Network Tunnel," filed Feb. 10, 2005.

U.S. Appl. No. 11/215,813, entitled "Point To Multi-Point Label Switched Paths With Label Distribution Protocol," filed Aug. 29, 2005.

U.S. Appl. No. 11/192,432, entitled "Transmission Of Layer Two (L2) Multicast Traffic Over Multi-Protocol Label Switching Networks," filed Jul. 28, 2005.

U.S. Appl. No. 11/445,353, entitled "Forming Multicast Distribution Structures Using Exchanged Multicast Optimization Data," filed Jun. 1, 2006.

U.S. Appl. No. 11/445,370, entitled "Forming Equal Cost Multipath Multicast Distribution Structures," filed Jun. 1, 2006.

U.S. Appl. No. 11/508,107, entitled Upstream Label Assignment For The Resource Reservation Protocol With Traffic Engineering, filed Aug. 22, 2006.

U.S. Appl. No. 11/566,480, entitled "Upstream Label Assignment For The Label Distribution Protocol," filed Dec. 4, 2006.

Aggarwal et al., "MPLS Upstream Label Assignment and Context Specific Label Space," Network Working Group Internet Draft, Jan. 2005, draft-raggarwa-mpls-upstream-label-00.txt, 9 pgs.

Wijnands et al., "Multicast Extensions for LDP," Network Working Group Internet Draft, Mar. 2005, draft-wijnands-mpls-ldp-mcast-ext-00.txt, 13 pgs.

Aggarwal et al., "MPLS Upstream Label Assignment for RSVP-TE and LDP," Aug. 24, 2005, http://www.tla-group.com/~mpls/ietf-63-mpls-upstream-rsvp-ldp.ppt, 8 pgs.

Fujita, N., "Dynamic Selective Replication Schemes for Content Delivery Networks," IPSJ SIG Notes, vol. 2001, No. 111, Information Processing Society of Japan, Nov. 21, 2001, 2 pgs.

Satyanarayana et al., "Extensions to GMPLS RSVP Graceful Restart", draft-aruns-ccamp-restart-ext-01.txt, Jul. 2004, Network Working Group Internet Draft. 23 pgs.

* cited by examiner

RESOURCE RESERVATION PROTOCOL WITH TRAFFIC ENGINEERING POINT TO MULTI-POINT LABEL SWITCHED PATH HIERARCHY

This application claims the benefit of U.S. Provisional Application Ser. No. 60/817,851, filed Jun. 30, 2006, the entire content of which is incorporated herein by reference.

TECHNICAL FIELD

The invention relates to computer networks and, more particularly, to engineering traffic flows within computer networks.

BACKGROUND

Routing devices within a network, often referred to as routers, maintain routing information that describe available routes through the network. Upon receiving an incoming packet, the router examines information within the packet and forwards the packet in accordance with the routing information. In order to maintain an accurate representation of the network, routers exchange routing information in accordance with one or more defined routing protocol, such as the Border Gateway Protocol (BGP).

The term "link" is often used to refer to the connection between two devices on a network. The link may be a physical medium, such as a copper wire, a coaxial cable, any of a host of different fiber optic lines or a wireless connection. In addition, network devices may define "virtual" or "logical" links, and map the virtual links to the physical links. As networks grow in size and complexity, the traffic on any given link, including peering links, may approach a maximum bandwidth capacity for the link, thereby leading to congestion and loss.

Multi-Protocol Label Switching (MPLS) is a mechanism used to engineer traffic patterns within Internet Protocol (IP) networks. By utilizing MPLS, a source device can request a path through a network to a destination device, i.e., a Label Switched Path (LSP). An LSP defines a distinct path through the network to carry MPLS packets from the source device to a destination device. Each router along a LSP allocates a label and propagates the label to the closest upstream router along the path. Routers along the path cooperatively perform MPLS operations to forward the MPLS packets along the established path. In order to carry multicast packets, a source device can request a path through a network to multiple destination devices, i.e., a Point to Multi-Point (P2MP) LSP.

In the case of a P2MP LSP, one or more of the routers along the path may comprise branch routers located at points where the path divides. In addition to performing MPLS operations to forward the MPLS multicast packets along the path, the branch routers perform replication of the multicast packets such that each branch of the P2MP LSP continues to carry copies of the multicast packets. A variety of protocols exist for establishing LSPs. For example, the Label Distribution Protocol (LDP), and the Resource Reservation Protocol with Traffic Engineering extensions (RSVP-TE).

SUMMARY

In general, the invention is directed toward techniques for Multi-Protocol Label Switching (MPLS) upstream label assignment for the Resource Reservation Protocol with Traffic Engineering (RSVP-TE). The techniques include extensions to the RSVP-TE that enable distribution of upstream assigned labels in Path messages from an upstream router to two or more downstream routers of tunnel established over a network. The tunnel may comprise a RSVP-TE P2MP Label Switched Path (LSP) or an Internet Protocol (IP) multicast tunnel.

The techniques also include extensions to the RSVP-TE that enable a router to advertise upstream label assignment capability to neighboring routers in the network. The MPLS upstream label assignment using RSVP-TE described herein enables a branch router to avoid traffic replication on a Local Area Network (LAN) for RSVP-TE P2MP LSPs.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
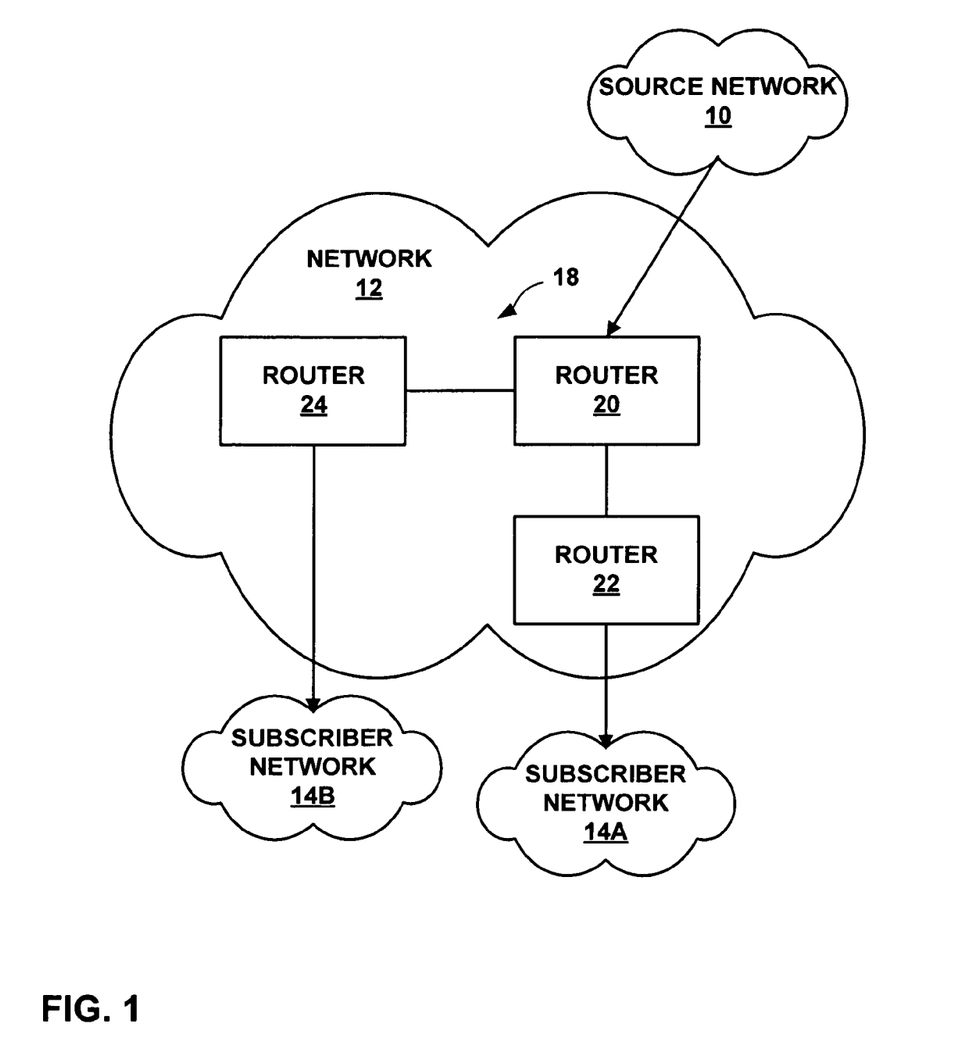
FIG. 1 is a block diagram illustrating an exemplary computer network having a tunnel established over the network between an upstream router and two or more downstream routers.

FIG. 1 is a block diagram illustrating an exemplary computer network 12 having a tunnel 18 established over network 12 between an upstream router 20 and downstream routers 22 and 24. Tunnel 18 may conform to a Multi-Protocol Label Switching (MPLS) tunnel or an Internet Protocol (IP) tunnel. For example, tunnel 18 may comprise a Resource Reservation Protocol with Traffic Engineering (RSVP-TE) Point to Multi-Point (P2MP) Label Switched Path (LSP) or an IP multicast tunnel. Routers 20, 22 and 24 within computer network 12 utilize extensions to the RSVP-TE that enable upstream label assignment.

Upstream router 20 and downstream routers 22 and 24 maintain routing information that describes available routes through computer network 12. Upon receiving an incoming packet, the routers examine information within the packet and forward the packet in accordance with the routing information. In order to maintain an accurate representation of network 12, the routers exchange routing information, e.g., bandwidth availability of links, in accordance with a defined routing protocol, such as an Interior Gateway Protocol (IGP).

In the example of FIG. 1, router 20 uses RSVP-TE extended to include upstream label assignment to carry traffic on tunnel 18 between source network 10 and subscriber networks 14A and 14B ("subscriber networks 14"). Source network 10 may comprise any public or private network or the Internet that provides multicast traffic to router 20 in network 12. Subscriber networks 14 may include LANs or wide area networks (WANs) that comprise a plurality of subscriber devices. The subscriber devices may include personal computers, laptops, workstations, personal digital assistants (PDAs), wireless devices, network-ready appliances, file servers, print servers or other devices that access source network 10 via network 12.

The extensions to the RSVP-TE enable routers 20, 22 and 24 to advertise upstream label assignment capability to neighboring routers in network 12. The extensions to RSVP-TE also enable upstream router 20 to distribute upstream assigned labels in Path messages to downstream routers 22 and 24 upon receiving advertisements indicating upstream label assignment capability from downstream routers 22 and 24. In the case where tunnel 18 comprises a RSVP-TE P2MP LSP, upstream label assignment described herein enables a branch router, such as router 20, to avoid replicating traffic to routers 22 and 24 on a Local Area Network (LAN).

In some cases, subscriber devices within subscriber networks 14 request multicast streams, such as IPTV channels, from source network 10. RSVP-TE with upstream label assignment extensions enables transmission of multicast traffic over tunnel 18 from source network 10 to subscriber networks 18 without requiring upstream router 20 to perform traffic replication. For example, upstream router 20 may allocate the same upstream assigned label to downstream router 22 and downstream router 24 such that upstream router 20 may forward traffic from source network 10 in a single packet with the upstream assigned label to both routers 22 and 24.

In accordance with principles of the invention, RSVP-TE is extended to include upstream label assignment capability and upstream assigned label distribution. RSVP-TE may also include a tunnel identifier that identifies tunnel 18, e.g., RSVP-TE P2MP LSP or IP multicast tunnel, as carrying upstream label assignments and traffic from upstream router 20 to downstream routers 22 and 24. In this way, the techniques enabling binding of the upstream assigned label to the tunnel 18. For example, RSVP-TE associates a forwarding equivalence class (FEC) with each LSP in network 12. In the case where tunnel 18 comprises a RSVP-TE P2MP LSP, upstream router 20 with upstream label assignment capability binds an upstream assigned label to the FEC for tunnel 18.

As described in more detail below, the RSVP-TE tunnel identifier also enables RSVP-TE P2MP hierarchy. Hierarchy is needed when an "inner" RSVP P2MP LSP is established over multiple edge domains via an "outer" RSVP P2MP LSP established within a backbone domain. The upstream label assignment extensions to RSVP-TE allow an upstream router within the backbone domain to tunnel the inner P2MP LSP with upstream assigned labels over the outer P2MP LSP within the backbone domain that has downstream assigned labels. The tunnel identifier allows the upstream router to signal upstream assigned labels for the inner P2MP LSP with a tunnel identifier for the outer P2MP LSP to the downstream routers of the outer P2MP LSP. In this way, the upstream router effectively binds the inner P2MP LSP to the outer P2MP LSP.

An exemplary application of RSVP-TE with upstream label assignment extensions will be described in which network 12 comprises a LAN and tunnel 18 within network 12 comprises a RSVP-TE P2MP LSP. Conventionally, RSVP-TE P2MP LSPs on a LAN require "ingress replication" in which a branch router for the P2MP LSP on the LAN replicates a received packet and sends a separate copy of the packet on the P2MP LSP to each of the downstream routers on the LAN that are adjacent to the branch router. In order to increase efficiency of bandwidth utilization, it is desirable for the branch router of the P2MP LSP on the LAN to send a single copy of the packet to multiple downstream routers that are adjacent to the branch router of the P2MP LSP.

As illustrated in FIG. 1, the upstream label assignment extensions to RSVP-TE enable each of downstream routers 22 and 24 to associate a label L allocated by upstream router 20 and used by upstream router 20 to transmit packets with the P2MP LSP on the LAN. First, upstream router 20 receives advertisements indicating upstream label assignment capability from neighboring routers in network 12, including router 22 and router 24. If downstream routers 22 and 24 are capable of supporting upstream assigned labels, upstream router 20 sends a Path message for the P2MP LSP to each of downstream routers 22 and 24 adjacent to upstream router 20 on the P2MP LSP, with the same UPSTREAM_ASSIGNED_LABEL object that carries an upstream assigned label, L.

Downstream routers 22 and 24 "reserve" the upstream assigned label in a separate context specific upstream label space maintained for upstream router 20. Upstream router 20 can then transmit a single packet for the P2MP LSP to downstream routers 22 and 24 with the upstream assigned label L. In the case where tunnel 18 includes a plurality of downstream routers (not shown), if a subset of the downstream routers do not support upstream label assignment, upstream router 20 may still use upstream label assignment for the remaining sub-set of the downstream routers. Upstream router 20 will then use ingress replication and downstream label assignment for downstream routers that do not support upstream label assignment.

Figure 2:
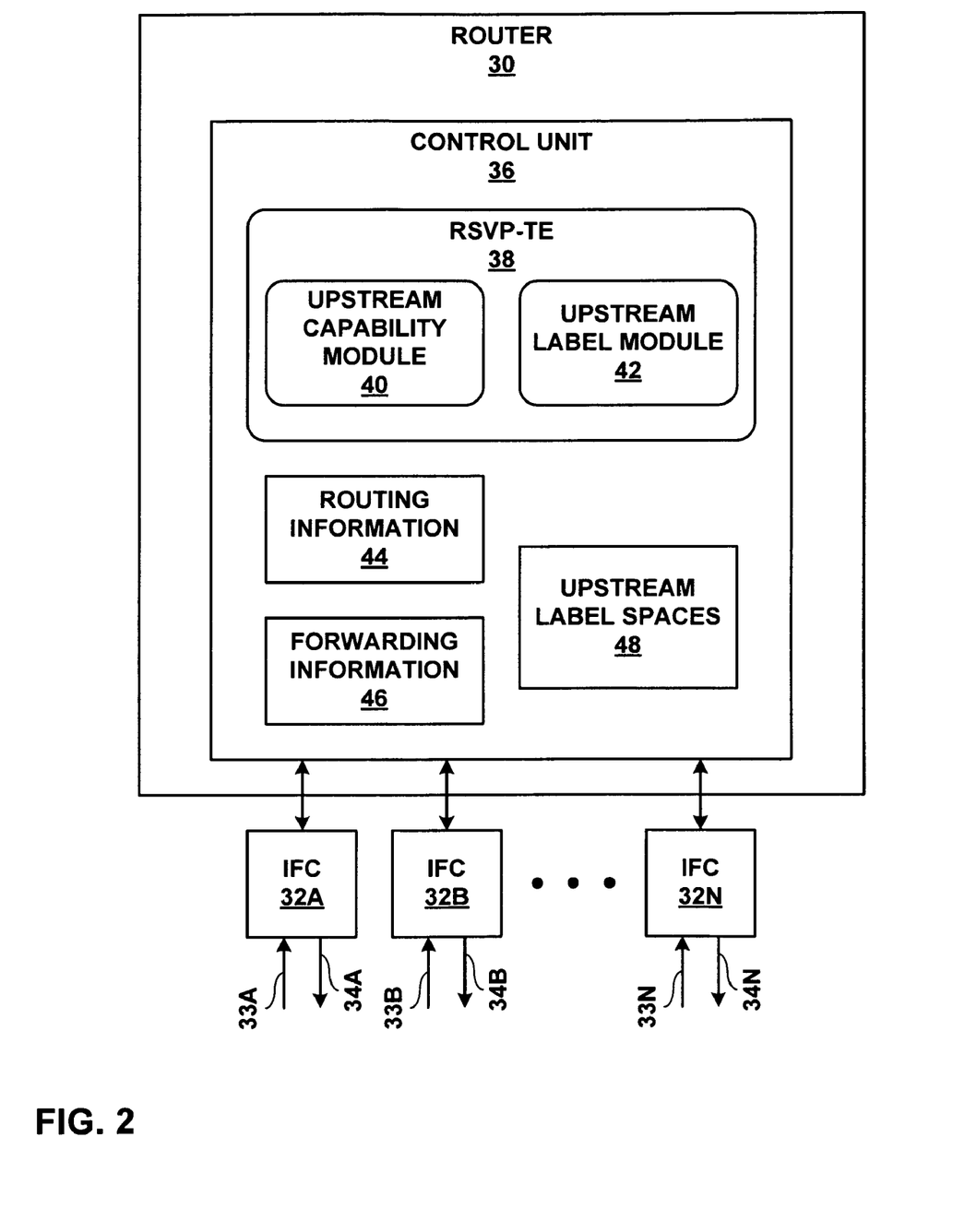
FIG. 2 is a block diagram illustrating an exemplary router capable of supporting RSVP-TE with upstream label assignment extensions in accordance with the techniques described herein.

FIG. 2 is a block diagram illustrating an exemplary router 30 capable of supporting RSVP-TE with upstream label assignment extensions in accordance with the techniques described herein. As one example, router 30 may comprise an upstream router or root of a tunnel established across a network. Router 30 may also comprise a downstream router or leaf of a tunnel established across the network by an upstream router. Router 30 may operate substantially similar to any of routers 20, 22 and 24 from FIG. 1.

In the example illustrated in FIG. 2, router 30 includes interface cards 32A-32N ("IFCs 32") that receive multicast packets via inbound links 33A-33N ("inbound links 33") and send multicast packets via outbound links 34A-34N ("outbound links 34"). IFCs 32 are typically coupled to links 33, 34 via a number of interface ports. Router 30 also includes a control unit 36 that determines routes of received packets and forwards the packets accordingly via IFCs 32.

Control unit 36 maintains routing information 44 that describes the topology of a network and, in particular, routes through the network. Routing information 44 may include, for example, route data that describes various routes within the network, and corresponding next hop data indicating appropriate neighboring devices within the network for each of the routes. Router 30 updates routing information 44 to accurately reflect the topology of the network.

Control unit 36 also maintains forwarding information 46 that associates network destinations with specific next hops and corresponding interface ports. In general, when router 30 receives a multicast packet with a downstream assigned label via one of inbound links 33, control unit 36 determines a destination and associated next hop for the packet in accordance with routing information 44 and forwards the packet on one of outbound links 34 to the corresponding next hop in accordance with forwarding information 46 based on the destination of the packet.

In accordance with the invention, control unit 36 provides an operating environment for RSVP-TE 38 to execute. RSVP-TE 38 includes an upstream capability module 40 and an upstream label module 42 to support upstream assigned labels. Control unit 36 also maintains upstream label spaces 48 for each upstream router. Upon receiving an upstream assigned label from an upstream router, router 30 reserves the label in a context specific label space within upstream label spaces 48 for that upstream router. Upstream label spaces 48 include forwarding information for each upstream router that associates network destinations with specific next hops and corresponding interface ports. When router 30 receives a multicast packet from an upstream router with an upstream assigned label via one of inbound links 33, control unit 36 determines a destination and associated next hop for the packet in accordance with routing information 44 and forwards the packet on one of outbound links 34 to the corresponding next hop in accordance with forwarding information for that upstream router within upstream label spaces 48 based on the destination of the packet.

In the case where router 30 comprises an upstream router or root of a tunnel, router 30 establishes the tunnel across a network having two or more downstream routers or leaves. Upstream capability module 40 then sends advertisements to neighboring routers in the network indicating that router 30 is capable of supporting upstream assigned labels. In addition, upstream capability module 40 receives advertisements from the neighboring routers in the network indicating that at least some of neighboring routers are capable of supporting upstream assigned labels.

Upon receiving the advertisements, upstream label module 42 allocates an upstream assigned label in a Path message to each of the downstream routers of the tunnel indicated to be capable of supporting upstream assigned labels. Upstream label module 42 then receives Resv messages from the capable downstream routers that do not include labels. Router 30 uses the upstream assigned label to forward packets to the downstream routers capable of supporting upstream assigned labels. In addition, control unit 36 may receive downstream assigned labels in Resv messages from downstream routers of the tunnel that do not support upstream assigned labels. In that case, router 30 uses the downstream assigned labels to forward packet to the downstream routers that are not capable of supporting upstream assigned labels.

Upstream label module 42 may also send a tunnel identifier in the Path message to each of the downstream routers of the tunnel that identifies the tunnel as carrying upstream assigned labels and packets from router 30. In this way, the tunnel identifier enables binding of the upstream label to the tunnel. In the case of P2MP LSP hierarchy, upstream label module may send an upstream assigned label for an "inner" P2MP LSP to downstream routers of an "outer" P2MP LSP that identify the "outer" P2MP LSP. In this way, the tunnel identifier enables binding of the inner P2MP LSP to the outer P2MP LSP.

In the case where router 30 comprises a downstream router or leaf of a tunnel, upstream capability module 40 sends advertisements to neighboring routers in the network indicating that router 30 is capable of supporting upstream assigned labels. Upstream label module 42 receives an upstream assigned label in a Path message from the upstream router or root of the tunnel. Router 30 reserves the label in a context specific label space within upstream label spaces 48 for that upstream router.

Upstream label module 42 then sends a Resv message that does not include labels to the upstream router. Upstream label module 42 recognizes that an upstream assigned label was received from the upstream router, and knows not to send a downstream assigned label back to the upstream router. Upstream label module 42 may also receive a tunnel identifier in the Path message from the upstream router of the tunnel that identifies the tunnel as carrying upstream assigned labels and packets from the upstream router. Router 30 receives packets from the upstream router with the upstream assigned label.

The architecture of router 30 illustrated in FIG. 2 is shown for exemplary purposes only. The invention is not limited to this architecture. In other embodiments, router 30 may be configured in a variety of ways. In one embodiment, for example, some of the functionally of control unit 36 may be distributed within IFCs 32. In another embodiment, control unit 36 may include a routing engine that performs routing functions and maintains routing information base (RIB), e.g., routing information 44, and a forwarding engine that performs packet forwarding based on a forwarding information base (FIB), e.g., forwarding information 46, generated in accordance with the RIB.

Control unit 36 may be implemented solely in software, or hardware, or may be implemented as a combination of software, hardware, or firmware. For example, control unit 36 may include one or more processors which execute software instructions. In that case, the various software modules of control unit 36 may comprise executable instructions stored on a computer-readable medium, such as computer memory or hard disk.

Figure 3:
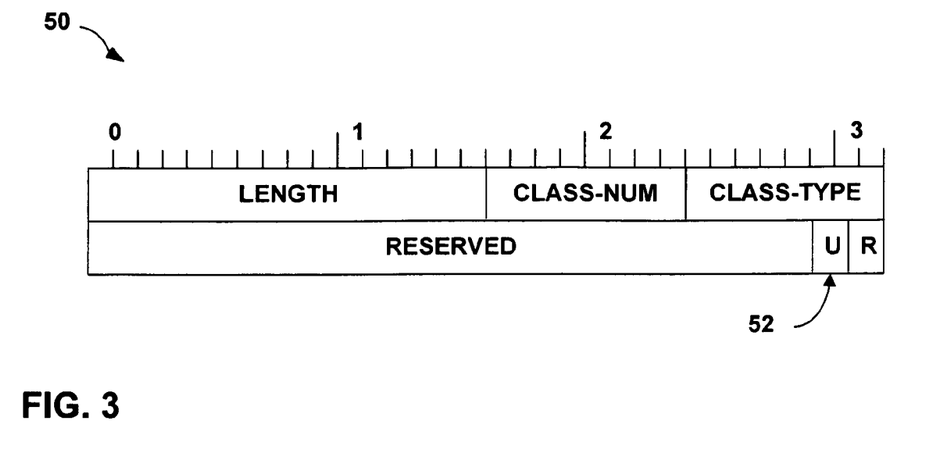
FIG. 3 illustrates an exemplary RSVP-TE Capability object used to indicate whether a router supports upstream assigned labels.

FIG. 3 illustrates an exemplary RSVP-TE Capability object 50 used to indicate whether a router supports upstream assigned labels. Capability object 50 is carried within RSVP-TE Hello messages sent from a router to neighboring routers in a network and indicates a set of capabilities supported by the router. Capability object 50 includes a length field, a class-number field, a class-type field (set equal to class-type 1), a reserved field, and an R flag that indicates support for RecoveryPath Srefresh. In accordance with the invention, a new flag, U flag 52, is defined in the Capability object 50 to indicate that a router supports upstream label assignment.

The usage of RSVP-TE Hello messages for exchanging upstream label assignment capability implies that a router may exchange RSVP-TE Hellos with a neighboring router before sending or receiving any other RSVP-TE messages with that neighboring router. An upstream router cannot allocate upstream assigned labels to downstream routers of a tunnel unless the upstream router knows that at least some of the downstream routers support upstream assigned labels. U flag 52 within Capability object 50 provides a mechanism for routers to advertise upstream label assignment capability to neighboring routers in a network.

The upstream label assignment capable U flag 52 comprises 1 bit. When U flag 52 is set (U=1), the router is capable of both distributing upstream assigned labels and receiving upstream assigned labels. When U flag 52 is not set (U=0), the router is not capable of either distributing or receiving upstream assigned labels. The reserved bits are be set to zero on transmission and ignored on receipt.

Figure 4:
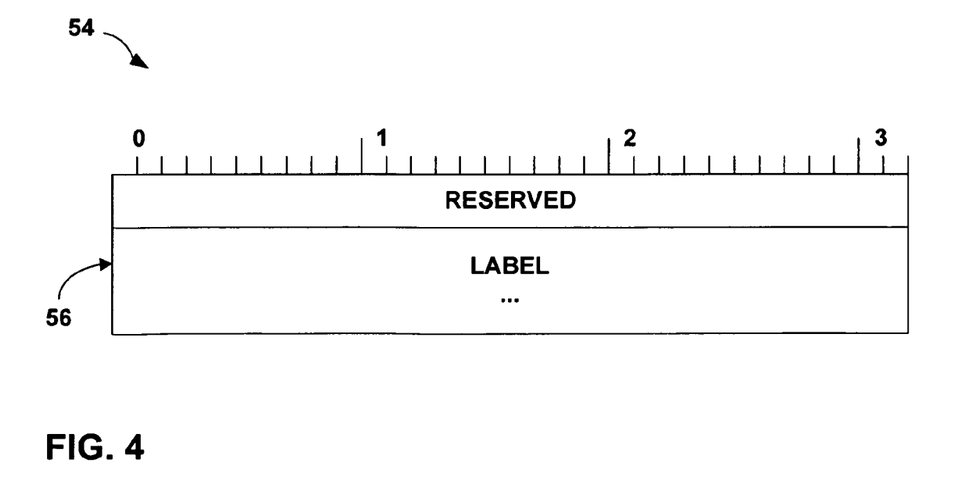
FIG. 4 illustrates an exemplary RSVP-TE UPSTREAM_ASSIGNED_LABEL object that signals upstream assigned labels.

FIG. 4 illustrates an exemplary RSVP-TE UPSTREAM_ASSIGNED_LABEL object 54 that signals upstream assigned labels. UPSTREAM_ASSIGNED_LABEL object 54 includes a reserved field and a label field 56. The class-number for this object comes from the 0bbbbbbb space and is to be determined by the Internet Assigned Numbers Authority (IANA). Label field 56 can be encoded in multiple ways depending on whether the class-type is 1 or the class-type is 2 or 3.

An upstream router or root of a RSVP-TE tunnel assigns upstream assigned labels, and distributes the upstream assigned labels to downstream router of the RSVP-TE tunnel within RSVP-TE Path messages. The upstream router does not distribute the UPSTREAM_ASSIGNED_LABEL object 54 to a downstream router of the tunnel if the downstream router did not advertise the Capability object 50 with the U flag 52 (from FIG. 3) set in RSVP-TE Hello messages.

If a downstream RSVP-TE router of the tunnel receives a Path message that carries UPSTREAM_ASSIGNED_LABEL object 54 and the downstream router does not support the object class-number and class-type, the downstream router will return an "Unknown Object C-Num/C-Type" error to the upstream router in a Resv message. If the downstream router does support the UPSTREAM_ASSIGNED_LABEL object 54, but is unable to process the upstream assigned label, the downstream router may send a PathErr with the error code "Routing problem" and the error value "MPLS Upstream Assigned Label Processing Failure" to the upstream router in a Resv message.

If the downstream router of the tunnel successfully processes the Path message and the upstream assigned label, the downstream router sends a Resv message to the upstream router, but does not include a downstream assigned label in the Resv Message. An upstream router and a downstream router for a P2MP LSP with an associated FEC F, either use downstream assigned label distribution or upstream assigned label distribution for FEC F, but not both, for packets transmitted on the P2MP LSP from the upstream router to the downstream router.

Figure 5:
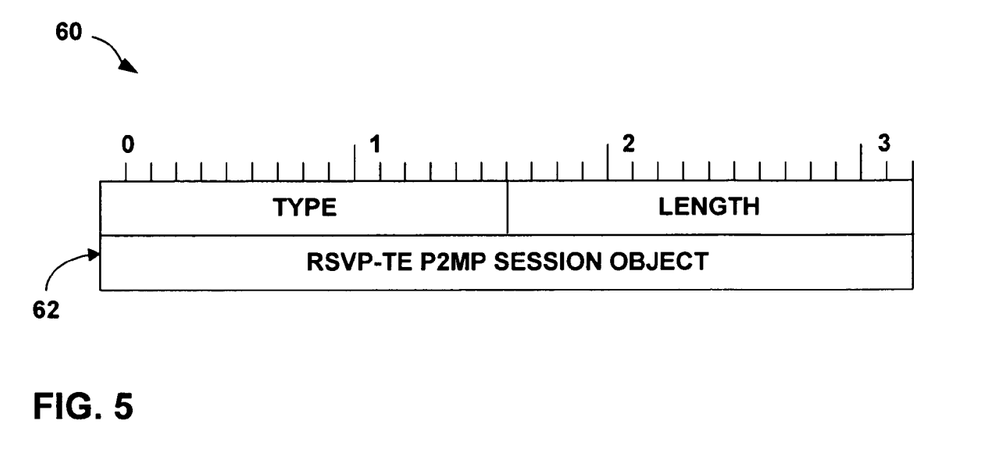
FIGS. 5 and 6 illustrate exemplary type-length-values (TLVs) of an RSVP-TE object that signals a Tunnel Identifier.
Figure 6:
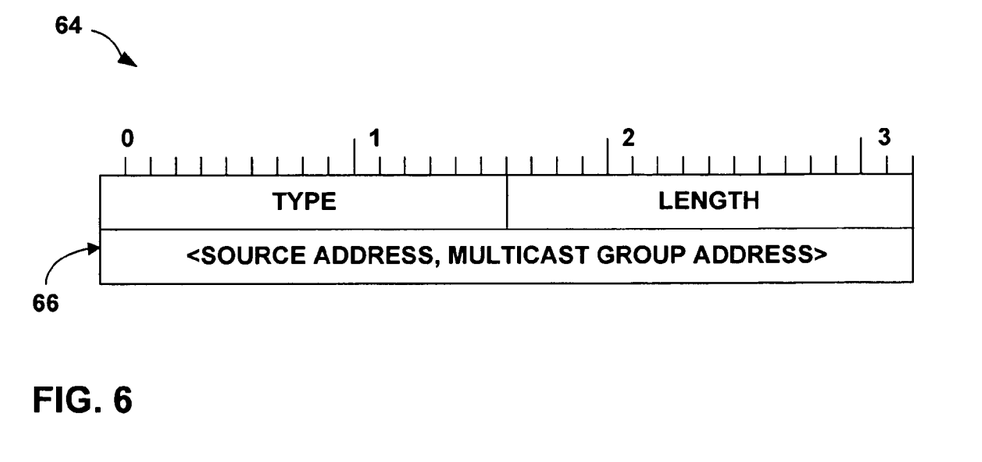

FIGS. 5 and 6 illustrate exemplary type-length-values (TLVs) of an RSVP-TE object that signals a Tunnel Identifier. An upstream router may transmit a MPLS packet with an upstream assigned label, L, to a downstream router by encapsulating the MPLS packet in an IP tunnel or a MPLS tunnel. In this case, the downstream router may determine that L is an upstream assigned label based on the tunnel on which the downstream router receives the packet. The TLVs illustrated in FIGS. 5 and 6 provide a mechanism for the upstream router to inform the downstream router that the upstream router will use a particular tunnel for transmitting MPLS packets with upstream assigned labels.

When using RSVP-TE for upstream label assignment, the IF_ID RSVP_HOP object may be used to signal the Tunnel Identifier. If the upstream router uses an IP or MPLS tunnel to transmit MPLS packets with upstream assigned labels to the downstream router, the upstream router includes the IF_ID RSVP_HOP object in Path messages along with the UPSTREAM_ASSIGNED_LABEL object 54 from FIG. 4. In accordance with the invention, two new TLVs are defined in the IF_ID RSVP_HOP object to support RSVP-TE P2MP LSPs and IP Multicast Tunnels, respectively. The TLV value acts as the Tunnel Identifier.

FIG. 5 illustrates an exemplary RSVP-TE P2MP LSP TLV 60 in the IF_ID RSVP_HOP object. RSVP-TE P2MP LSP TLV 60 includes a type field, a length field, and a value field 62 that acts as the Tunnel Identifier. In this case, value field 62 comprises the RSVP-TE P2MP Session Object and optionally the P2MP Sender Template Object. The TLV value field 62 identifies the RSVP-TE P2MP LSP.

This mechanism enables RSVP-TE P2MP hierarchy. The Tunnel Identifier allows an upstream router to tunnel an "inner" P2MP LSP, the label for which is upstream assigned, over an "outer" P2MP LSP that has multiple downstream routers. The RSVP-TE P2MP LSP TLV allows the upstream router to signal the binding of the inner P2MP LSP to the outer P2MP LSP to the multiple downstream routers. The control plane signaling between the upstream router and the multiple downstream routers for the inner P2MP LSP uses directed RSVP-TE signaling messages.

FIG. 6 illustrates an exemplary IP Multicast Tunnel TLV 64 in the IF_ID RSVP_HOP object. IP Multicast Tunnel TLV 64 includes a type field, a length field, and a value field 66 that acts as the Tunnel Identifier. In this case, value field 66 comprises a <Source Address, Multicast Group Address> tuple. The TLV value field 66 identifies the IP Multicast Tunnel.

Figure 7:
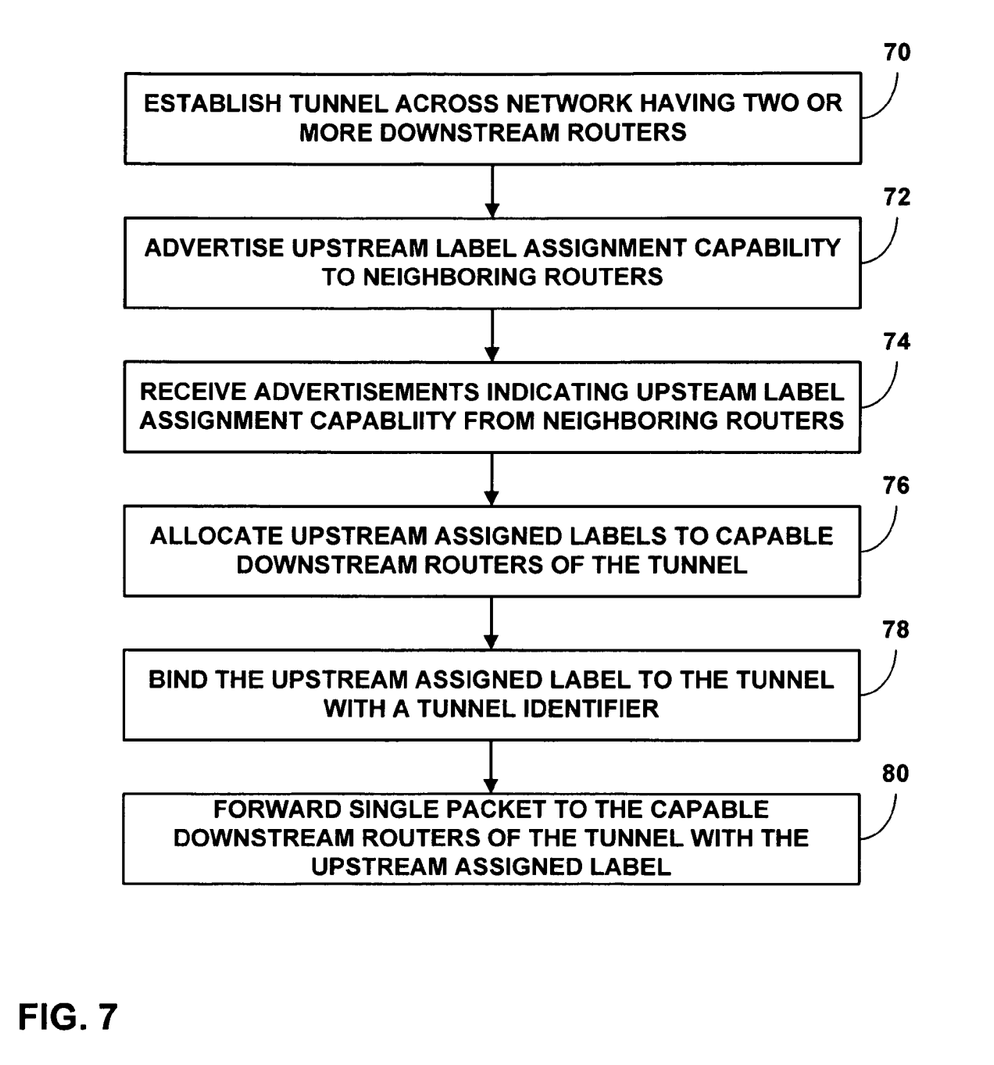
FIG. 7 is a flowchart illustrating an exemplary operation of distributing upstream assigned labels using RSVP-TE.

FIG. 7 is a flowchart illustrating an exemplary operation of distributing upstream assigned labels using RSVP-TE. The operation will be described herein reference to router 30 from FIG. 2. Upstream router 30 establishes a tunnel across a network between upstream router 30 and two or more downstream routers (70). The tunnel may comprise an IP tunnel, such as an IP multicast tunnel, or a MPLS tunnel, such as a RSVP-TE P2MP LSP.

Upstream capability module 40 advertises upstream label assignment capability to neighboring routers in the network (72). The advertisements may comprise RSVP Hello messages including a Capability object with a set U flag. In turn, upstream capability module 40 may receive advertisements indicating upstream label assignment capability from the neighboring routers in the network (74).

For purposes of explanation, it is assumed that at least two of the downstream routers advertise that they are capable of supporting upstream label assignment. Upstream label module 42 then allocates an upstream assigned label to the capable downstream routers of the tunnel in a Path message (76). The label allocation may comprise an UPSTREAM_ASSIGNED_LABEL object. Upstream label module 42 may also send a tunnel identifier in the Path message to the capable downstream routers that identifies the tunnel as carrying upstream assigned labels from upstream router 30. The tunnel identifier may comprise TLVs of an RSVP-TE object that signal either a RSVP-TE P2MP LSP or an IP Multicast Tunnel. In this way, upstream router 30 binds the upstream assigned label to the tunnel with the tunnel identifier (78).

Upstream router 30 then forwards a single packet received from source network 10 to the capable downstream routers of the tunnel with the upstream assigned label (80). Upstream router 30 may also send packets to downstream routers of the tunnel that are not capable of supporting upstream assigned labels. In this case, upstream router 30 receives downstream assigned labels from each of the incapable downstream router of the tunnel. Upstream router 30 then performs ingress replication and sends copies of the packets to each of the incapable downstream routers with the associated downstream assigned label.

Figure 8:
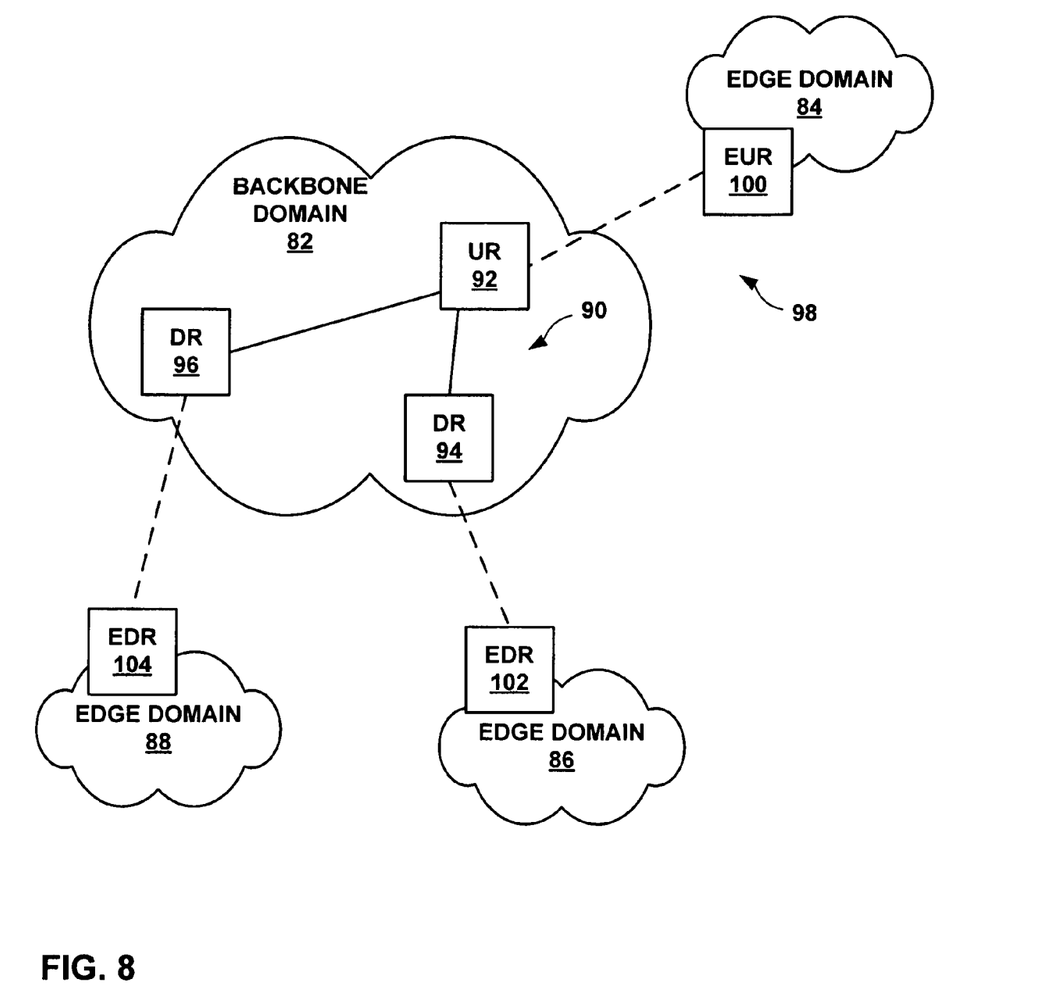
FIG. 8 is a block diagram illustrating a computer system including a backbone domain and edge domains.

FIG. 8 is a block diagram illustrating a computer system including a backbone domain 82 and edge domains 84, 86 and 88. Backbone domain 82 includes an upstream router (UR) 92 and downstream routers (DR) 94 and 96. UR 92 establishes a first RSVP-TE P2MP LSP 90 over backbone domain 82 between UR 92 and DRs 94 and 96. First P2MP LSP 90 utilizes downstream assigned labels. Edge domain 84 includes an edge upstream router (EUR) 100, edge domain 86 includes edge downstream router (EDR) 102, and edge domain 88 includes EDR 104. EUR 100 establishes a second RSVP-TE P2MP LSP 98 over edge domains 84, 86 and 88 via first P2MP LSP 90 within backbone domain 82 between EUR 100 and EDRs 102 and 104.

As described above, the RSVP-TE tunnel identifier enables RSVP-TE P2MP hierarchy. First P2MP LSP 90 within backbone domain 82 comprises an "outer" P2MP LSP, and second P2MP LSP 98 across edge domains 84, 86 and 88 comprises an "inner" P2MP LSP. The upstream label assignment extensions to RSVP-TE described herein allow UR 92 within backbone domain 82 to tunnel second P2MP LSP 98 with upstream assigned labels over first P2MP LSP 90 within backbone domain 82. The tunnel identifier described herein allows UR 92 to signal upstream assigned labels for second P2MP LSP 98 with an identifier for first P2MP LSP 90 to DRs 94 and 96 of first P2MP LSP 90. In this way, UR 92 effectively binds second P2MP LSP 98 to first P2MP LSP 90.

RSVP-TE P2MP hierarchy allows all of the routers within backbone domain 82 to maintain control and forwarding state only for first P2MP LSP 90 within backbone domain 82. The control and forward state for second P2MP LSP 98 is nested within first P2MP LSP 90. Therefore, only the routers within backbone domain 82 associated with first P2MP LSP 90 (i.e., UR 92, DR 94, and DR 96) maintain the control and forwarding state for second P2MP LSP 98.

Figure 9:
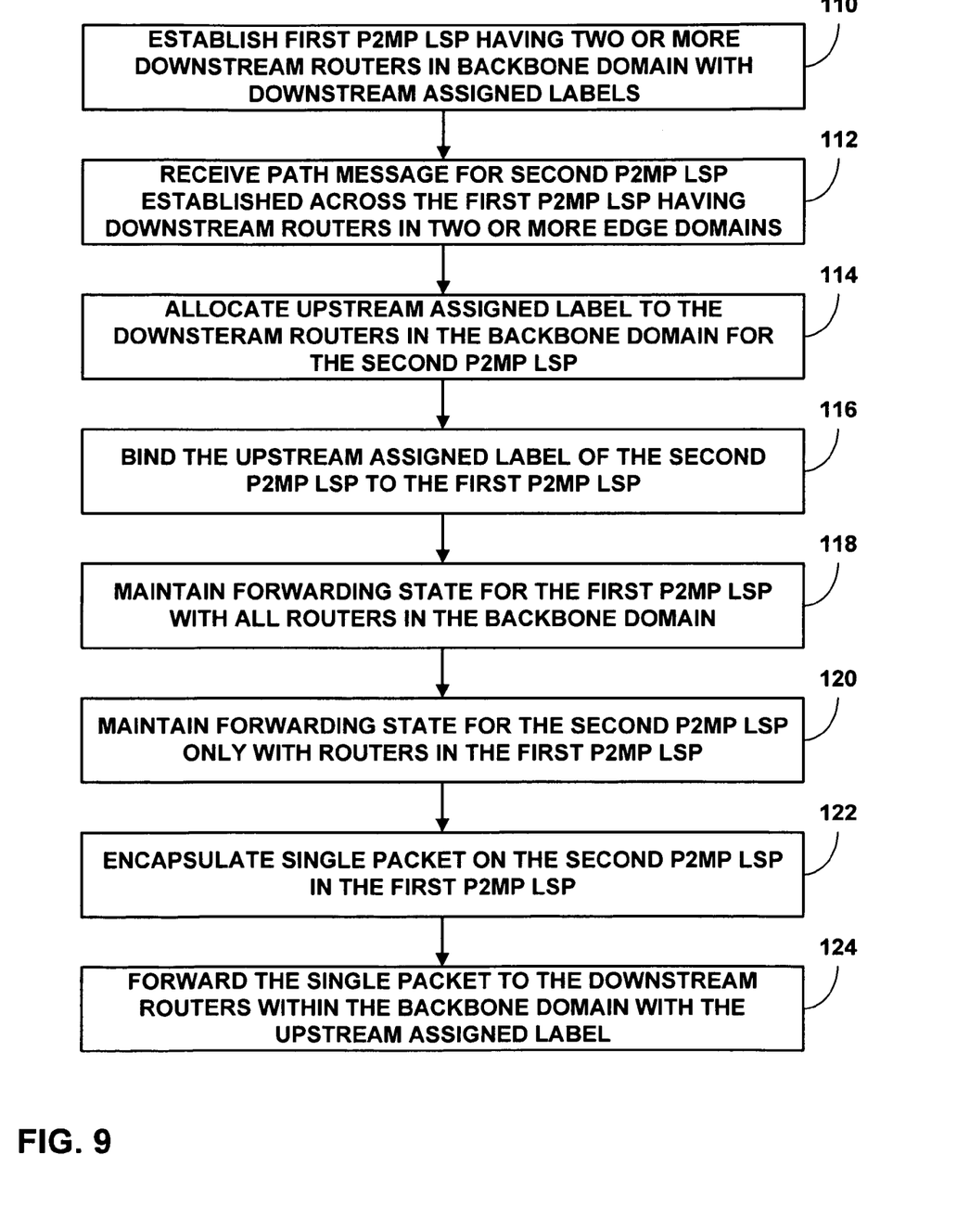
FIG. 9 is a flowchart illustrating an exemplary operation of performing RSVP-TE P2MP LSP hierarchy with upstream assigned labels.

FIG. 9 is a flowchart illustrating an exemplary operation of performing RSVP-TE P2MP LSP hierarchy with upstream assigned labels. The operation will be described herein in reference to UR 92 within backbone domain 82 from FIG. 8. UR 92 establishes first RSVP-TE P2MP LSP 90 across backbone domain 82 between UR 92 and DRs 94 and 96 with downstream assigned labels (110). UR 92 then receives a Path messages from EUR 100 within edge domain 84 for second RSVP-TE P2MP LSP 98 established over edge domains 84, 86 and 88 via first P2MP LSP 90 within backbone domain 82 between EUR 100 and EDRs 102 and 104 (112).

For purposes of explanation, it is assumed that DRs 94 and 96 within backbone domain 82 advertise that they are capable of supporting upstream label assignment to UR 92. UR 92 then allocates an upstream assigned label for second P2MP LSP 98 in a Path message to DRs 94 and 96 within the backbone domain 82 (114). UR 92 also sends a tunnel identifier in the Path message to DRs 94 and 96 within backbone domain 82 that identifies first P2MP LSP 90. In this way, UR 92 binds second P2MP LSP 98 to first P2MP LSP 90 with the tunnel identifier (116).

UR 92 and all the routers within backbone domain 82 maintain control and forwarding state for first P2MP LSP 90 within backbone domain 82. The control and forward state for second P2MP LSP 98 is nested within first P2MP LSP 90. Therefore, only UR 92, DR 94, and DR 96 of first P2MP LSP 90 within backbone domain 82 maintain the control and forwarding state for second P2MP LSP 98. UR 92 then encapsulates a single packet received on second P2MP LSP 98 in first P2MP LSP 90 (122) and forwards the single packet to DRs 94 and 96 of first P2MP LSP 90 within backbone domain 82 with the upstream assigned label (124).

Various embodiments of the invention have been described. These and other embodiments are within the scope of the following claims.

The invention claimed is:

1. A method comprising:
   establishing a first Resource Reservation Protocol with Traffic Engineering (RSVP-TE) Point to Multi-Point (P2MP) Label Switched Path (LSP) across a backbone domain between an upstream router and two or more downstream routers, wherein the upstream router is positioned between the downstream routers and a source of traffic for the first RSVP-TE P2MP LSP;
   receiving, with the upstream router, a Path message for a second RSVP-TE P2MP LSP established over two or more edge domains via the first RSVP-TE P2MP LSP within the backbone domain;
   sending a Path message from the upstream router to the downstream routers within the backbone domain to establish a P2MP LSP hierarchy with the first RSVP-TE P2MP LSP and the second RSVP-TE P2MP LSP, wherein the Path message sent by the upstream router to the downstream routers includes an upstream assigned label allocated by the upstream router for the second RSVP-TE P2MP LSP and a tunnel identifier that identifies the first RSVP-TE P2MP LSP to establish a P2MP LSP hierarchy;
   after establishing the first RSVP-TE P2MP LSP and the second RSVP-TE P2MP LSP as a P2MP LSP hierarchy, encapsulating a packet received on the second RSVP-TE P2MP LSP in the first RSVP-TE P2MP LSP using the upstream assigned label; and
   forwarding a single copy of the encapsulated packet from the upstream router to the downstream routers of the first RSVP-TE P2MP LSP within the backbone domain with the upstream assigned label.

2. The method of claim 1, further comprising receiving RSVP-TE advertisements that include upstream label assignment capability indications from one or more of the downstream routers of the first RSVP-TE P2MP LSP within the backbone domain, wherein sending a Path message comprises sending a Path message to the one or more downstream routers of the first RSVP-TE P2MP LSP from which the upstream label assignment capability indications were received.

3. The method of claim 1, wherein sending a tunnel identifier that identifies the first RSVP-TE P2MP LSP in the Path message to the downstream routers within the backbone domain comprises binding the second RSVP-TE P2MP LSP to the first RSVP-TE P2MP LSP.

4. The method of claim 1, further comprising maintaining control and forwarding state of the first RSVP-TE P2MP LSP in every router within the backbone domain.

5. The method of claim 1, further comprising maintaining control and forwarding state of the second RSVP-TE P2MP LSP in the upstream router and the two or more downstream routers of the first RSVP-TE P2MP LSP within the backbone domain.

6. The method of claim 1, wherein control and forwarding state of the second RSVP-TE P2MP LSP is nested within the first RSVP-TE P2MP LSP within the backbone domain.

7. A tangible computer-readable medium comprising instructions that cause a programmable processor to:
   establish a first Resource Reservation Protocol with Traffic Engineering (RSVP-TE) Point to Multi-Point (P2MP) Label Switched Path (LSP) across a backbone domain between an upstream router and two or more downstream routers, wherein the upstream router is positioned between the downstream routers and a source of traffic for the first RSVP-TE P2MP LSP;
   receive, with the upstream router, a Path message for a second RSVP-TE P2MP LSP established over two or more edge domains via the first RSVP-TE P2MP LSP within the backbone domain;
   send a Path message from the upstream router to the downstream routers within the backbone domain to establish a P2MP LSP hierarchy with the first RSVP-TE P2MP LSP and the second RSVP-TE P2MP LSP, wherein the Path message sent by the upstream router to the downstream routers includes an upstream assigned label allocated by the upstream router for the second RSVP-TE P2MP LSP and a tunnel identifier that identifies the first RSVP-TE P2MP LSP to establish a P2MP LSP hierarchy;

after establishing the first RSVP-TE P2MP LSP and the second RSVP-TE P2MP LSP as a P2MP LSP hierarchy, encapsulating a packet received on the second RSVP-TE P2MP LSP in the first RSVP-TE P2MP LSP using the upstream assigned label; and forwarding a single copy of the encapsulated packet from the upstream router to the downstream routers of the first RSVP-TE P2MP LSP within the backbone domain with the upstream assigned label.

8. The tangible computer-readable medium of claim 7, further comprising instructions that cause the programmable processor to receive RSVP-TE advertisements that include upstream label assignment capability indications from one or more of the downstream routers of the first RSVP-TE P2MP LSP within the backbone domain, and send a Path message to the one or more downstream routers of the first RSVP-TE P2MP LSP from which the upstream label assignment capability indications were received.

9. The tangible computer-readable medium of claim 7, wherein the instructions cause the programmable processor to bind the second RSVP-TE P2MP LSP to the first RSVP-TE P2MP LSP.

10. The tangible computer-readable medium of claim 7, further comprising instructions that cause the programmable processor to maintain control and forwarding state of the second RSVP-TE P2MP LSP in the upstream router and the two or more downstream routers of the first RSVP-TE P2MP LSP within the backbone domain.

11. An upstream router within a backbone domain comprising:

a signaling protocol to establish a first Resource Reservation Protocol with Traffic Engineering (RSVP-TE) Point to Multi-Point (P2MP) Label Switched Path (LSP) across the backbone domain between the upstream router and two or more downstream routers, wherein the upstream router is positioned between the downstream routers and a source of traffic for the first RSVP-TE P2MP LSP;

a control unit having a processor that receives a Path message for a second RSVP-TE P2MP LSP established over two or more edge domains via the first RSVP-TE P2MP LSP within the backbone domain; and an upstream label module of the signaling protocol that allocates an upstream assigned label for the second RSVP TE P2MP LSP and sends a Path message to the downstream routers within the backbone domain that includes the upstream assigned label allocated for the second RSVP-TE P2MP LSP and a tunnel identifier that identifies the first RSVP-TE P2MP LSP to establish a P2MP LSP hierarchy, wherein the upstream router encapsulates a packet received on the second RSVP-TE P2MP LSP in the first RSVP-TE P2MP LSP using the upstream assigned label, and forwards a single copy of the encapsulated packet from the upstream router to the downstream routers of the first RSVP-TE P2MP LSP within the backbone domain with the upstream assigned label.

12. The upstream router of claim 11, further comprising an upstream capability module of the signaling protocol that receives RSVP-TE advertisements including upstream label assignment capability indications from one or more of the downstream routers of the first RSVP-TE P2MP LSP within the backbone domain, wherein the upstream label module sends a Path message to the one or more downstream routers of the first RSVP-TE P2MP LSP from which the upstream label assignment capability indications were received.

13. The upstream router of claim 11, wherein the tunnel identifier that identifies the first RSVP-TE P2MP LSP in the Path message binds the second RSVP-TE P2MP LSP to the first RSVP-TE P2MP LSP.

14. The upstream router of claim 11, wherein every router within the backbone domain maintains control and forwarding state of the first RSVP-TE P2MP LSP.

15. The upstream router of claim 11, wherein the upstream router and the two or more downstream routers of the first RSVP-TE P2MP LSP within the backbone domain maintain control and forwarding state of the second RSVP-TE P2MP LSP.

16. The upstream router of claim 11, wherein control and forwarding state of the second RSVP-TE P2MP LSP is nested within the first RSVP-TE P2MP LSP within the backbone domain.

17. A system comprising:

a backbone domain that includes an upstream router and two or more downstream routers, wherein the upstream router establishes a first Resource Reservation Protocol with Traffic Engineering (RSVP-TE) Point to Multi-Point (P2MP) Label Switched Path (LSP) across the backbone domain between the upstream router and the downstream routers; and an edge domain that includes an upstream router that establishes a second RSVP-TE P2MP LSP over two or more edge domains via the first RSVP-TE P2MP LSP within the backbone domain, wherein the upstream router within the backbone domain is positioned between the downstream routers of the backbone domain and the upstream router of the edge domain, wherein the upstream router within the backbone domain sends a Path message to the downstream routers within the backbone domain that includes an upstream assigned label allocated by the upstream router within the backbone domain for the second RSVP-TE P2MP LSP and a tunnel identifier that identifies the first RSVP-TE P2MP LSP to establish a P2MP LSP hierarchy, and wherein the upstream router encapsulates a packet received on the second RSVP-TE P2MP LSP in the first RSVP-TE P2MP LSP using the upstream assigned label, and forwards a single copy of the encapsulated packet from the upstream router to the downstream routers of the first RSVP-TE P2MP LSP within the backbone domain with the upstream assigned label.

* * * * *